(No Model.)
J. W. ROGERS.
HORSESHOE.
No. 560,235. Patented May 19, 1896.
Fig. 1.
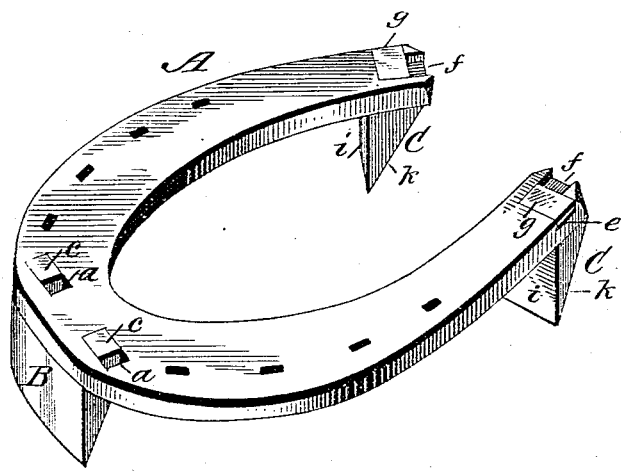
Fig. 2. Fig. 5. Fig. 3.
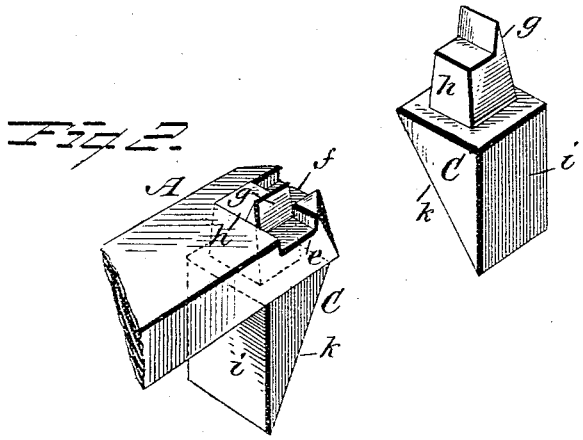 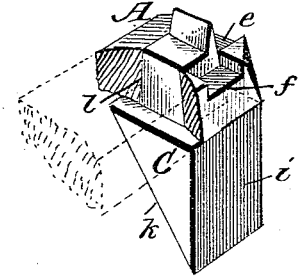
Fig. 4.
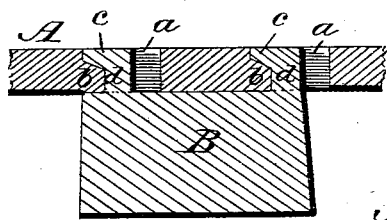
Witnesses
O. J. Williamson
Geo. H. Gillman
Inventor
Joseph W. Rogers.
per Chas. H. Fowler
Attorney.
ANDREW B.GRAHAM. PHOTO-LITHO. WASHINGTON.D.C.

UNITED STATES PATENT OFFICE.

JOSEPH WAREN ROGERS, OF BODINES, PENNSYLVANIA.

HORSESHOE.

SPECIFICATION forming part of Letters Patent No. 560,235, dated May 19, 1896.

Application filed February 26, 1896. Serial No. 580,775. (No model.)

*To all whom it may concern:*

Be it known that I, JOSEPH WAREN ROGERS, a citizen of the United States, residing at Bodines, in the county of Lycoming and State of Pennsylvania, have invented certain new and useful Improvements in Horseshoes; and I do hereby declare that the following is a full, clear, and exact description of the same, reference being had to the annexed drawings, making a part of this specification, and to the letters of reference marked thereon.

The present invention has for its object to provide a simple and effective means for attaching and securely holding in place upon a horseshoe the calks thereof and enabling the calks at the heel of the shoe to be attached thereto in different positions to adapt them to various uses, as will be hereinafter described, and subsequently pointed out in the claims.

Figure 1 of the drawings represents a perspective view of a horseshoe with my invention applied thereto; Fig. 2, a detail perspective view of one end of the shoe, showing the heel-calk in position to be attached thereto; Fig. 3, a similar view, partly in section, showing the calk in a reverse position; Fig. 4, a detail view in section showing the toe-calk in position to be secured to the shoe; Fig. 5, a detail view in perspective of one of the heel-calks.

In the accompanying drawings, A represents a horseshoe formed at the toe portion with transverse elongated openings *a* and mortised inclined seats *b* to receive the inclined flanges *c* upon the upwardly-projecting lugs *d* of the toe-calk B. When the toe-calk is in position shown in Fig. 4 of the drawings, one of the nails used to secure the shoe to the hoof of the animal is driven through the elongated opening upon the right side of the calk, which will securely hold the same in place. This toe-calk may be of any suitable form and construction and may be attached to the toe of the shoe in any manner found most desirable.

The heel-calks (which are the essential feature of my invention) and the manner of constructing the ends of the shoe for convenience of attaching them thereto will now be described.

The upper sides of the ends of the horseshoe are formed with mortised seats *e f*, which are at right angles to each other and extend out through the side and end thereof, respectively. These mortised seats are to receive the wedge-shaped lug *g*, formed on one side of the tapering shank *h* of the calk C. This calk has a straight side *i* and an inclined side *k* opposite thereto, as clearly shown in the drawings, and the ends of the shoe have openings *l* in shape to conform to the taper of the shank *h*. The object in giving a tapering form to the shank *h* of the heel-calk and having a corresponding taper to the opening *l* and giving to the lug *g* a wedge-shaped form will be understood from the following description. The straight and inclined sides of the calk C enable the calk to be reversed in position to adapt it to circumstances or uses under certain conditions. When used as a side calk to prevent slipping of the horse sidewise, the inclined side *k* comes upon the inside of the shoe, such position of the calks being shown in Fig. 3 of the drawings, the straight side of the calk coming upon the outer end of the heel, thereby enabling a horse to stand straight on his foot on icy roads and adapting it as a winter shoe and also as a summer shoe by reversing the calks, as shown in Figs. 1 and 2 of the drawings. The changing or adjusting the position of the calks adapts the shoe to any condition of road over which the team is to be driven, thus providing a superior horseshoe both in strength, durability, and effectiveness. The shank *h* being tapering with a corresponding taper to the opening *l*, the shank is inserted in the opening and the lug *g* driven down upon its seat. The shank will be drawn upward in the opening, thereby forming a more rigid and perfect connection of the shank with the shoe than were the shank perfectly straight and preventing the possibility of the calk becoming loose by continued wear.

The advantage in having the lug *g* wedge-shaped, as shown, is to enable it to be more conveniently clenched into the mortised seat when coming in contact with the clenching-iron, which iron is held against the shoe for turning down the lug into its seat. The two mortised seats *e f* enable the calk to be connected to the shoe in different positions, the lug $g$ being formed upon any side of the shank $h$, as found most desirable.

Having now fully described my invention, what I claim as new, and desire to secure by Letters Patent, is—

1. A horseshoe provided with a suitable toe-calk, and mortised seats at right angles to each other upon the heel ends of the shoe, and suitable calks provided with shanks and lugs upon one side of the shanks adapted to engage with the mortised seats, substantially as and for the purpose set forth.

2. A horseshoe provided with a suitable toe-calk, a mortised seat upon the ends of the heel of the shoe, and calks having tapering shanks and wedge-shaped lugs thereon to engage with the mortised recess, substantially as and for the purpose specified.

In testimony that I claim the above I have hereunto subscribed my name in the presence of two witnesses.

JOSEPH WAREN ROGERS.

Witnesses:
 JOHN KERR,
 HENRY RILEY.